Patented Apr. 9, 1946

2,398,185

UNITED STATES PATENT OFFICE 2,398,185

PROCESS OF RECOVERING HORMONES

John W. Lee, Indianapolis, Ind., and Frank E. Stirn, Pearl River, N. Y., assignors to Lederle Laboratories, Inc., New York, N. Y., a corporation of Delaware No Drawing. Application June 19, 1944, Serial No. 541,132

7 Claims. (Cl. 167—74)

This invention relates to a method for obtaining physiologically active material from urine, such material being of a hormone character with activity ascribed to the ovarian and anterior pituitary-like sex hormones present therein.

It is known that the urine of pregnant higher animals, including humans, contains, in addition to ovarian hormones, a considerable amount of anterior pituitary-like sex hormone. While the quantity of this hormone is considerable from the standpoint of its activity, it is minute when viewed with respect to the amount of material from which it is to be extracted. Due to the low concentration of hormone present in pregnancy urine and its relative instability, ordinary methods of extraction are not practical.

The gonadotropic hormones found in pregnancy urine are protein-like in character and are thought to be muco-proteins similar to certain enzymes. They may be obtained in purified form as a white powder, soluble in water, but insoluble in most organic solvents. They may be most advantageously separated from pregnancy urine by a process of adsorption.

One of the primary objects of our invention is to separate physiologically active hormone material from pregnancy urine by a process of adsorption using sulfonamides as adsorbing agents.

Another object of our invention is to isolate an anterior pituitary-like hormone from pregnancy urine.

A still further object of our invention is to provide a process capable of recovering a large proportion of the anterior pituitary-like hormone from aqueous liquids containing the same.

We have found that the sulfonamides, now widely used as bacteriostatic agents, may be used as adsorbing agents for physiologically active hormones found in pregnancy urine. The sulfonamides found useful for our purpose are the ortho- and para-toluene sulfonamides, para-toluenesulfonyl-anilide, para-toluenesulfonyl-ethylamide, para-toluenesulfonylamide, benzenesulfonylamide. We prefer to use the ortho- and para-toluene sulfonamides not only because they are very efficient as adsorbing agents, but also because they are readily available in commercial mixtures at a reasonable cost.

The ortho- and para-toluene sulfonamides are particularly valuable as adsorbing agents because they are insoluble in acid aqueous solutions and are soluble in alkaline aqueous solutions. They are soluble in organic solvents such as acetone, benzene, ether, etc., thus providing a means of separating the insoluble anterior pituitary-like hormone from the soluble ovarian hormone and the sulfonamides.

There are several methods by means of which an insoluble precipitate of sulfonamides, necessary as adsorbents for the physiologically active material, can be obtained in acid aqueous solutions such as acidified pregnancy urine. One method is to add the sulfonamides in a very fine state of subdivision directly to the acidified pregnancy urine. Another method is to dissolve the sulfonamides in a small amount of an organic solvent such as acetone and then add this to the acidified pregnancy urine. A third method, and one which we prefer, is to add the sulfonamides to pregnancy urine made alkaline, in which they are soluble. On acidifying the alkaline solution a finely-divided, flocculent precipitate of the sulfonamides is produced.

In our preferred method of carrying out our invention a mixture of ortho- and para-toluene sulfonamides is dissolved in an alkaline solution. This alkaline solution is added to the pooled pregnancy urine (filtered if necessary) to give a clear solution. The alkaline urine solution is made acid by the addition of a mineral acid to a pH of from about 2 to about 5. The ortho- and para-toluene sulfonamides are then thrown down as a flocculent precipitate from all parts of the solution, carrying with it the adsorbed physiologically active hormones. The precipitate is removed and mixed with an organic solvent in which the sulfonamides are soluble while the anterior pituitary-like hormone remains as an insoluble precipitate. The anterior pituitary-like hormone is separated from the solution and can be further purified as shown in the following specific example.

To 26 liters of urine is added 0.572 kilo of Santicizer No. 9 (a mixture of ortho- and para-toluene sulfonamides) which is dissolved in 884 cc. of water and 160 cc. of saturated sodium hydroxide. After addition of this solution to the urine with stirring, 260 cc. of concentrated hydrochloric acid is added to bring the pH to 5.0. Further acid is added to adjust the final pH to 3.6. This is stirred for one-half hour to allow for complete adsorption. The precipitate is filtered, washed with distilled water, and pressed. This precipitate is dissolved in two liters of acetone. The Santicizer dissolves in the acetone, and an insoluble precipitate of organic matter containing the anterior pituitary-like hormone is obtained. The precipitate is washed with acetone, separated, and dried.

The dried powder is suspended in a volume of cold 50% aqueous alcohol equal to ten times the weight of crude hormone, and the pH is adjusted to 6.0 by the addition of 2% ammonia in 50% ethanol. The suspension is allowed to stand 24 hours at 0°-5° C. and then centrifuged at high speed. The precipitate is washed several times by mechanical stirring with 2 volumes of 50% ethanol. The combined alcoholic extracts are treated with 2 volumes of cold absolute ethanol to precipitate the hormone. The precipitate is washed with 85% ethanol and then extracted 3 to 4 times by stirring for 30 minutes with one to two times its volume of 0.3 M. sodium acetate-acetic acid buffer in 50% ethanol at a pH of 4.8.

After centrifuging, the combined acid-alcoholic solutions are treated with an equal volume of cold absolute ethanol and chilled for several hours. The resulting precipitate is successively washed with 75% and then 95% ethanol and finally with anhydrous acetone. It is occasionally desirable to add a trace of sodium acetate during the last washings. The amorphous powder assayed over 2000 international units per liter of pooled pregnancy urine.

In place of hydrochloric acid we can use other mineral acids such as nitric, sulfuric, phosphoric, etc.

In dissolving the ortho- and para-toluene sulfonamides preparatory to adding to urine, we may use bases such as potassium hydroxide, potassium carbonate, sodium carbonate, and the like.

We have found that acetone is the organic solvent of choice in separating ortho- and para-toluene sulfonamides from the anterior pituitary-like hormone, and since the ovarian hormones found in pregnancy urine are soluble in acetone, it is also a means of separating the ovarian from the anterior pituitary-like hormone.

It was found in carrying out our invention that if the anterior pituitary-like hormone remained in acid medium such as that present at the time of adsorption (pH 3.6) for a longer period of time, there is usually a decrease in activity of the extracted hormone. While the hormone may remain in acid medium from 15 to 60 minutes without appreciable loss of activity, about 30 minutes has been found to give best yields, as complete precipitation of the sulfonamides is also a factor.

Our method of adsorption is applicable to human pregnancy urine, for obtaining the anterior pituitary-like hormone. It is also useful in obtaining the ovarian hormones from the urine of animals such as the horse.

We claim:

1. A process for recovering a gonadotropic substance from urine which comprises adding thereto an alkaline solution containing ortho- and para-toluene sulfonamides, acidifying with a mineral acid, separating the resulting precipitate and treating said precipitate with an organic solvent of the group consisting of acetone, benzene and ether to dissolve the ortho- and para-toluene sulfonamides leaving the hormone as undissolved residue.

2. A process for recovering anterior pituitary-like hormone from pregnancy urine which comprises adding an alkaline solution containing ortho- and para-toluene sulfonamides to the urine, acidifying with hydrochloric acid to a pH of from 2 to 5, separating the resulting precipitate and suspending said precipitate in acetone thereby dissolving ortho- and para-toluene sulfonamides leaving the hormone as an undissolved residue.

3. A process of separating anterior pituitary-like hormone from pregnancy urine which comprises adding a sodium hydroxide solution containing ortho- and para-toluene sulfonamides to the urine, acidifying with a mineral acid to a pH of about 3.6, separating the resulting precipitate and suspending said precipitate in acetone thereby dissolving ortho- and para-toluene sulfonamides leaving the anterior pituitary-like hormone as an undissolved residue.

4. In the process of obtaining anterior pituitary-like hormone the steps of forming in pregnancy urine a precipitate of ortho- and para-toluene sulfonamides, separating the precipitate which contains the anterior pituitary-like hormone therewith from the liquid, treating the precipitate with acetone to dissolve the ortho- and para-toluene sulfonamides and removing the acetone solution from the remaining hormone precipitate.

5. A method of separating hormones from aqueous solution which comprises forming a precipitate of a sulfonamide in said solution, removing the precipitate from the solution, dissolving the precipitate in an organic solvent of the group consisting of acetone, benzene and ether and removing the insoluble hormone from said medium.

6. A method of recovering hormones from pregnancy urine which comprises the steps of acidifying urine containing hormones and a sulfonamide dissolved therein thereby forming a precipitate of the sulfonamide with hormone adsorbed thereon, separating the precipitate from the urine, dissolving the sulfonamide portion of the precipitate in an organic solvent of the group consisting of acetone, benzene and ether and recovering the undissolved hormone therefrom.

7. A process of separating anterior pituitary-like hormone from pregnancy urine which comprises adding an alkaline solution containing ortho- and para-toluene sulfonamides to the said urine, acidifying with a mineral acid to a pH of from 2 to 5, separating the resulting precipitate and suspending said precipitate in an organic solvent of the group consisting of acetone, benzene and ether, thereby dissolving the ortho- and para-toluene sulfonamides leaving the anterior pituitary-like hormone as an undissolved residue.

JOHN W. LEE.
FRANK E. STIRN.